United States Patent [19]
Torres

[11] Patent Number: 5,437,005
[45] Date of Patent: Jul. 25, 1995

[54] GRAPHICAL METHOD OF PROCESSING MULTIPLE DATA BLOCKS

[75] Inventor: Robert J. Torres, Colleyville, Tex.

[73] Assignee: International Business Machines Corporation, Armonk, N.Y.

[21] Appl. No.: 177,225

[22] Filed: Apr. 1, 1988

[51] Int. Cl.[6] .................................................. G06F 7/00
[52] U.S. Cl. .................................. 395/145; 364/237.2; 364/943.44; 364/DIG. 2
[58] Field of Search .............................. 400/63, 67, 68; 340/707, 709, 710, 721; 364/200 MS File, 900 MS File; 395/144, 145

[56] References Cited

U.S. PATENT DOCUMENTS

| | | | |
|---|---|---|---|
| 4,445,795 | 5/1984 | Levine et al. | 406/63 |
| 4,538,183 | 8/1985 | Kanno et al. | 358/280 |
| 4,542,376 | 9/1985 | Bass et al. | 340/724 |
| 4,559,598 | 12/1985 | Goldwasser et al. | 364/419 |
| 4,663,615 | 5/1987 | Hernandez et al. | 340/721 |
| 4,674,040 | 6/1987 | Barker et al. | 364/300 |
| 4,688,167 | 8/1987 | Agarwal | 364/200 |
| 4,736,308 | 4/1988 | Heckel | 364/518 |

FOREIGN PATENT DOCUMENTS 2193827  2/1988  United Kingdom .

OTHER PUBLICATIONS

"Perfect Writer" reference manual, pp. x, xi, 1-13, 1-14, 3-6, 4-6, 4-7, 15-4, 15-5.
Nelson et al, "Using Lotus Manuscript", Mar. 30, 1987, pp. 17, 18, 34-36, 61-74, 81-88, 314-321.

*Primary Examiner*—Parshotam S. Lall
*Assistant Examiner*—Ayni Mohamed
*Attorney, Agent, or Firm*—Jonathan E. Jobe; Andrew J. Dillon

[57] ABSTRACT

A method of processing multiple noncontiguous data blocks within a document is disclosed. A graphical pointing device such as a light pen, computer tablet, mouse pointer, or touch sensitive screen is utilized to designate an initial location and a final location for a plurality of noncontiguous data blocks within a displayed document or set of documents. In response to each designation of a final location for a particular data block that data block is temporarily stored for future processing. In one embodiment of the present invention, the stored data blocks may then be processed utilizing selectable processing commands and the resultant new document may then be displayed to the operator.

14 Claims, 3 Drawing Sheets

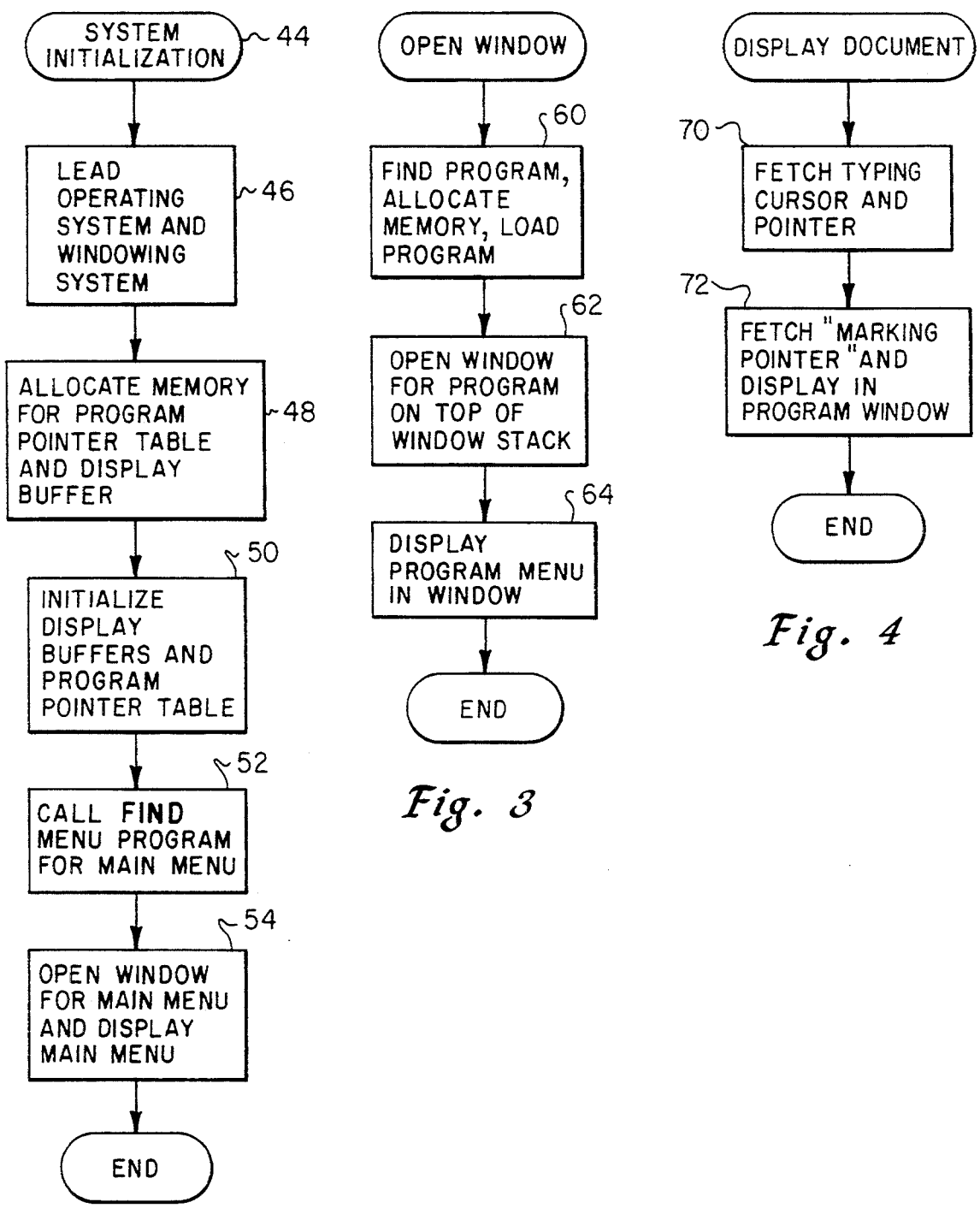

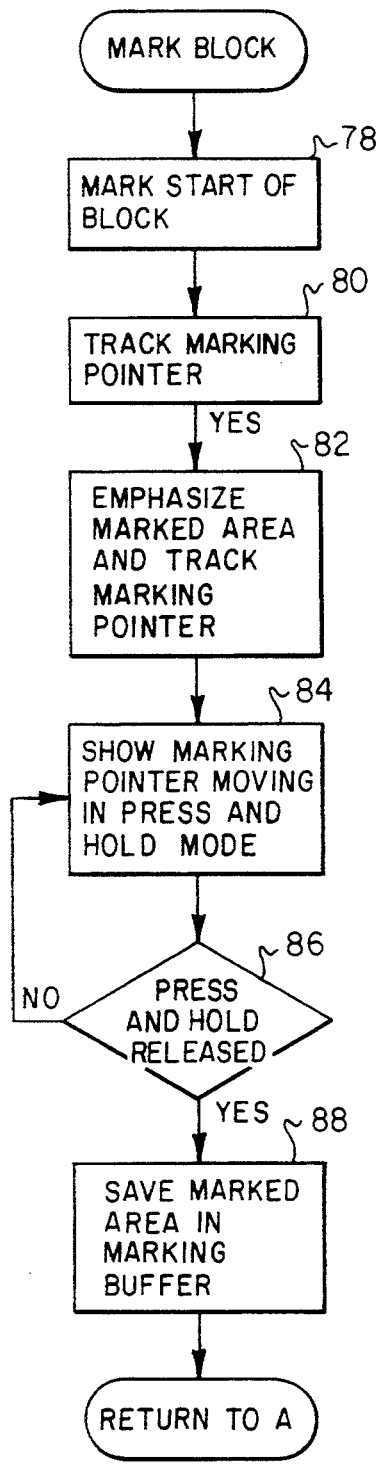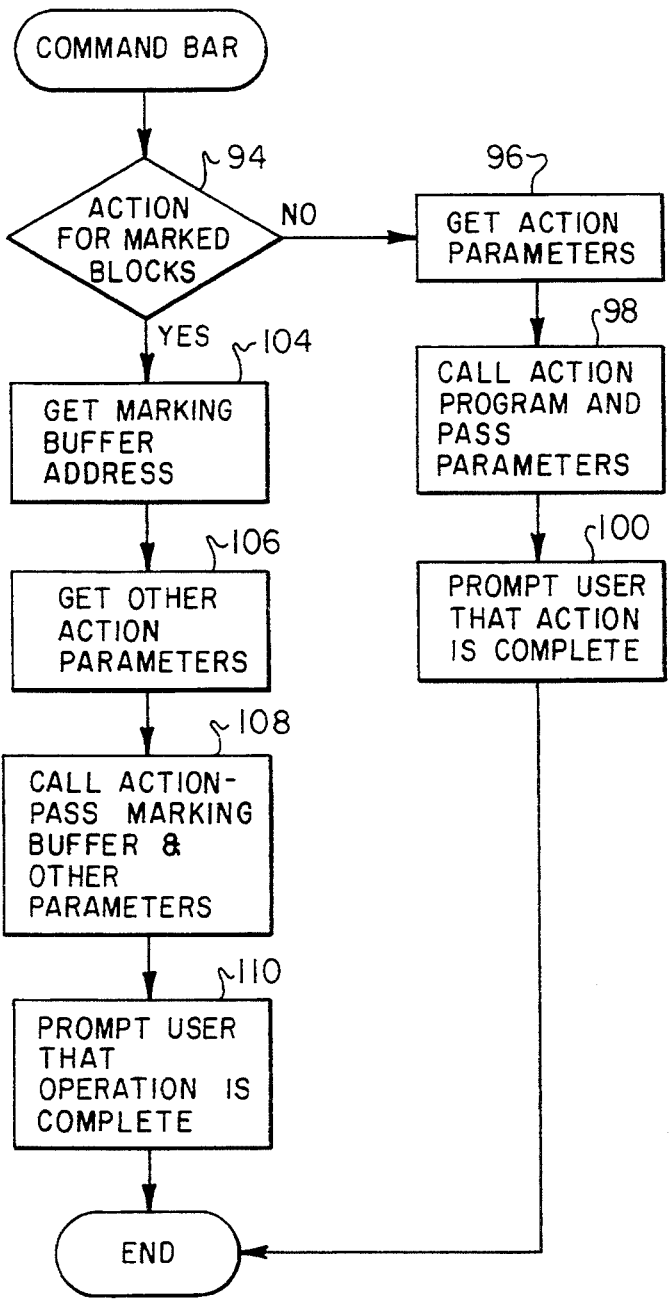
Fig. 6
Fig. 5

GRAPHICAL METHOD OF PROCESSING MULTIPLE DATA BLOCKS

BACKGROUND OF THE INVENTION

1. Technical Field

This invention relates in general to methods for processing data blocks within a document and more particularly to methods for processing multiple noncontiguous data blocks within one or more documents.

2. Background Art

The manipulation, alteration or deletion of data blocks within a computer stored document is well known in the prior art. For example, most word processing programs include processing commands which permit an operator to alter, delete, copy, or move a designated segment or block within a stored document. This is generally accomplished by placing a cursor at the initial location of the desired data block and entering a selected keystroke indicative of data block selection. Next, the cursor is moved to the end of the selected data block and another keystroke is entered indicative of the end of a selected data block. In many known word processing systems the data block thus selected is visually indicated by "highlighting" or a reverse video display of the selected data block.

Generally the data block selected in the above referenced manner is then operated on in accordance with a process command which is or has been previously selected by the operator. Additionally, certain systems permit the operator to graphically move or "drag" the designated data block to a second location. In either event, should an operator desire to process more than one noncontiguous data block in this manner, he or she must do so sequentially, by designating each data block individually, operating on that data block and then designating a second data block. There exists no provision in the prior art which permits an operator to simply and easily designate a plurality of data blocks within a document or documents for subsequent processing.

In view of the above, it should be apparent that a need exists for a method which permits an operator to process multiple noncontiguous data blocks without the necessity of long tedious sequential operations which require many repetitive actions and/or keystrokes by the operator.

SUMMARY OF THE INVENTION

It is therefore one object of the present invention to provide an improved method for processing multiple data blocks.

It is another object of the present invention to provide an improved method for processing multiple noncontiguous data blocks which does not require multiple sequential operations on individual data blocks.

It is yet another object of the present invention to provide an improved method for processing multiple noncontiguous data blocks which permits processing and display of the data blocks.

The foregoing objects are achieved as is now described. The method of processing multiple noncontiguous data blocks in accordance with the present invention preferably utilizes a graphical pointing device such as light pen, computer tablet, mouse pointer, or touch sensitive screen to designate an initial location and final location for each of a plurality of noncontiguous data blocks within a displayed document or documents. In response to each designation of a final location for an individual data block, that data block is temporarily stored for future processing. In one embodiment of the present invention the stored data blocks may then be processed utilizing selectable processing commands and the resultant new document is displayed to the operator.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

FIG. 2 is a flow diagram of a system initialization operation which may be utilized in accordance with the present invention;

FIG. 3 is a flow diagram of a windowing method of operation which may be utilized in accordance with the invention;

FIG. 4 is a flow diagram of a document display operation which may be utilized in accordance with the present invention;

FIG. 5 is a flow diagram of the data block marking and storage operation utilized in accordance with the present invention; and FIG. 6 is a flow diagram of the processing operations which may be utilized in accordance with the present invention.

DETAILED DESCRIPTION OF THE PREFERRED EMBODIMENT

Figure 1:
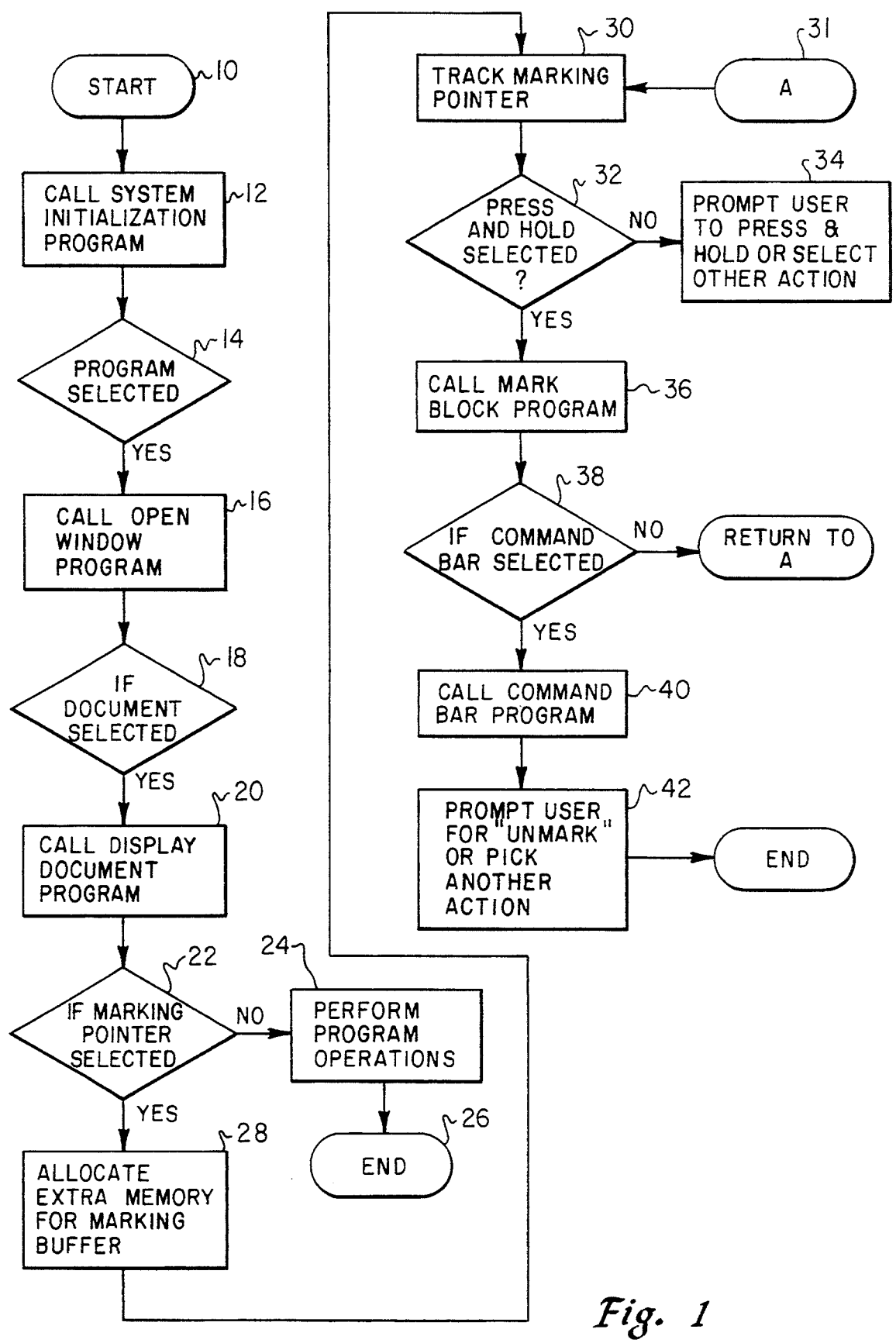
FIG. 1 is a flow diagram of the software operations of the graphical method of processing multiple data blocks in accordance with the present invention.

With reference now to the figures, and in particular with reference to FIG. 1, there is depicted a flow diagram of the software operations inherent in the method of the present invention. As can be seen, after starting, as indicated in block 10, it is necessary to call the system initialization program, as illustrated by block 12.

Referring now to FIG. 2, there is depicted a logic flow diagram of a system initialization operation which may be utilized in accordance with the present invention. As is illustrated, system initialization 44 begins by loading the operating system and windowing system as indicated at block 46. Next, it is necessary to allocate memory for the program pointer table and display buffer as illustrated by block 48. Block 50 depicts the initialization of the display buffers and the program pointer table. Finally, blocks 52 and 54 illustrate the location and display of the main menu associated with the system.

With reference again to FIG. 1, block 14 represents the selection by the operator of a suitable program, such as a word processing program, and block 16 depicts the opening of an appropriate window program, as illustrated in FIG. 3. Referring now to FIG. 3, the opening of a window program is illustrated. Block 60 illustrates the selection of a particular program, allocation of an appropriate amount of memory and the loading of that program. Next, blocks 62 and 64 depict the opening of a window for the selected program and the displaying of the selected program menu within that window.

Referring again to FIG. 1, block 18 represents a determination of whether or not a particular document has been selected. Those skilled in the art will appreciate that as utilized herein, the term "document" is utilized to describe any document or record containing multiple blocks of data which may be stored within a computer memory. If a document has been selected, the document display program is called, as illustrated by block 20.

With reference now to FIG. 4, a flow diagram of a document display program which may be utilized in conjunction with the present invention is depicted. As can be seen, the document display program includes a typing cursor and pointer, as illustrated by block 70 and a "marking pointer" as illustrated by block 72. The marking pointer disclosed herein may be implemented with any graphical pointing device, such as a light pen, computer tablet and stylus, mouse pointer or touch sensitive screen, along with an appropriate screen display identifying the graphical pointing device utilized.

Referring once again to FIG. 1, block 22 is utilized to determine whether or not the marking pointer has been selected. If not, any normal program operation selected is performed until such time as the operator finishes utilization of the program, as illustrated by blocks 24 and 26. If the marking pointer has been selected, block 28 depicts the allocation of an additional memory space for a marking buffer memory, which is utilized in accordance with the present invention, to temporarily store designated data blocks.

Block 30 depicts the tracking of the marking pointer, as it moves through the displayed document or documents, to determine which data blocks are designated for future processing. The designation of a particular data block is accomplished by activating the marking pointer in a manner consistent with the type of graphical pointing device utilized. This activation is referred to in block 32 as the selection of "press and hold". In the event that the marking pointer is not activated (press and hold is not selected), block 34 illustrates the prompting of the operator to activate the marking pointer or select another program option.

When the marking pointer has been activated, block 36 depicts the calling of the mark block program. FIG. 5 illustrates the mark block program which is utilized in accordance with the method of the present invention. As can be seen, block 78 illustrates the marking of the initial location of a designated data block within the displayed document as identified by the activation of the marking pointer. Block 80 depicts the tracking of the marking pointer and block 82 illustrates the emphasis of the marked portion of the document by reverse video or other appropriate means. As can be seen in block 84, the mark block program may be utilized to track the marking pointer while it is activated, until such time as the activation of the marking pointer is released, as depicted in block 86. After the final location of the a data block has been determined, as indicated by the deactivation of the marking pointer, block 88 illustrates the storage in a marking buffer of the contents of the designated data block. Next, the mark block program returns to block 31 of FIG. 1 to determine whether or not a second data block will be designated by the reactivation of the marking pointer by selecting "press and hold" again. Thereafter, a second data block may be designated and store in accordance with the process described above.

After all desired data blocks have been graphically designated and stored in accordance with the method of the present invention, block 38 of FIG. 1 determines whether or not the command bar has been selected. Block 40 depicts the calling of the command bar program, as illustrated in FIG. 6. Referring now to FIG. 6, a flow diagram of a suitable command bar program is depicted.

Block 94 of FIG. 6 is utilized to determine whether or not an action has been selected for those data blocks stored within the marking buffer (see FIG. 5). If not, the selected action parameters are called and completed, as depicted in blocks 96, 98 and 100. When an action parameter is selected for the designated data blocks, block 104 illustrates the selection of a marked data block within the marking buffer by the obtaining of the address within the marking buffer thereof. Blocks 106 and 108 operate to determine which actions are selected and call the action related thereto. Those skilled in the art will appreciate that such actions as "copy", "cut" or "delete" are typical of the actions which may be utilized in accordance with the present invention to process designated data blocks. After all actions have been accomplished, the command bar program will preferably cause the resultant new document to be displayed to the operator.

Referring back to FIG. 1, block 42 illustrates a final step in the method of the present invention. As can be seen, the user at this point is prompted to deselect the marking pointer or to select another action within the program.

In summary, the method of the present invention permits an operator to display one or more documents and graphically designate a plurality of noncontiguous data blocks within those documents in a manner similar to an electronic "highlighter". In this manner, the operator need not operate on each data block individually, but rather can pick and choose selected data blocks from multiple documents and process those data blocks to generate a subsequent document.

While the invention has been particularly shown and described with reference to a preferred embodiment, it will be understood by those skilled in the art that various changes in form and detail may be made therein without departing from the spirit and scope of the invention.

I claim:

1. A method in a data processing system of processing multiple data blocks comprising the steps of:
   displaying one or more selected documents;
   graphically designating a plurality of noncontiguous data blocks within said one or more displayed documents; and
   storing each of said graphically designated plurality of noncontiguous data blocks for future processing in response to said graphic designation.

2. The method of processing multiple data blocks according to claim 1 further including the step of:
   processing said plurality of noncontiguous data blocks.

3. The method of processing multiple data blocks according to claim 2 further including the step of:
   displaying said processed plurality of noncontiguous data blocks.

4. The method of processing multiple data blocks according to claim 2 wherein said step of processing said stored plurality of noncontiguous data blocks comprises merging said plurality of noncontiguous data blocks into a second document.

5. A method in a data processing system of processing multiple data blocks comprising the steps of:
   displaying one or more selected documents;

graphically designating a plurality of noncontiguous data blocks within said one or more displayed documents by designating an initial location and a final location for each data block; and storing each of said graphically designated plurality of noncontiguous data blocks in response to the designation of said final location for each of said data blocks.

6. A method of processing multiple data blocks according to claim 5 further including the step of:

processing said stored plurality of noncontiguous data blocks.

7. A method of processing multiple data blocks according to claim 6 further including the step of displaying said processed plurality of noncontiguous data blocks.

8. A method of processing multiple data blocks according to claim 6 wherein said step of processing said stored plurality of noncontiguous data blocks comprises merging said plurality of noncontiguous data blocks into a second document.

9. A method in a data processing system having a graphical pointing device of processing multiple data blocks comprising the steps of:

displaying one or more selected documents;

selecting a graphical pointing device;

graphically designating with said graphical pointing device a plurality of noncontiguous data blocks within said one or more displayed documents by designating an initial location and a final location for each data block; and storing each of said graphically designated plurality of noncontiguous data blocks in response to the designation of said final location for each of said data blocks.

10. The method of processing multiple data blocks according to claim 9 further including the step of:

processing said plurality of noncontiguous data blocks.

11. The method of processing multiple data blocks according to claim 10 further including the step of:

displaying said processed plurality of noncontiguous data blocks.

12. The method of processing multiple data blocks according to claim 10 wherein said step of processing said stored plurality of noncontiguous data blocks comprises merging said plurality of noncontiguous data blocks into a second document.

13. A data processing system for processing multiple data blocks, said data processing system comprising:

means for displaying one or more selected documents;

means for graphically designating a plurality of noncontiguous data blocks within said one or more displayed documents; and means for storing each of said graphically designated plurality of noncontiguous data blocks for future processing in response to said graphic designation.

14. A data processing system for processing multiple data blocks, said data processing system comprising:

means for displaying one or more selected documents;

means for graphically designating a plurality of noncontiguous data blocks within one or more displayed documents by designating an initial location and final location for each data block; and means for storing each of said graphically designated plurality of noncontiguous data blocks in response to the designation of said final location for each of said data blocks.

* * * * *